(12) United States Patent
Atarashi et al.

(10) Patent No.: US 8,713,580 B2
(45) Date of Patent: Apr. 29, 2014

(54) INFORMATION PROCESSING DEVICE AND DISPLAY CONTROL METHOD

(75) Inventors: Yoshitaka Atarashi, Kawasaki (JP); Katsuaki Tanaka, Kawasaki (JP); Yoshibumi Fukuda, Tokyo (JP)

(73) Assignee: Xanavi Informatics Corporation, Zama-shi (JP)

( * ) Notice: Subject to any disclaimer, the term of this patent is extended or adjusted under 35 U.S.C. 154(b) by 1836 days.

(21) Appl. No.: 11/523,043

(22) Filed: Sep. 19, 2006

(65) Prior Publication Data

US 2007/0067739 A1    Mar. 22, 2007

(30) Foreign Application Priority Data

Sep. 20, 2005   (JP) .................................. 2005-271741

(51) Int. Cl.
*G06F 3/00* (2006.01)
*G06F 9/54* (2006.01)
*H04N 13/02* (2006.01)
*H04N 7/173* (2011.01)

(52) U.S. Cl.
CPC ............ *G06F 9/542* (2013.01); *H04N 13/0289* (2013.01); *H04N 7/17318* (2013.01)
USPC ......................................................... 719/310

(58) Field of Classification Search
CPC ....................................................... G06F 9/452
USPC ................................... 719/310, 318; 715/700
See application file for complete search history.

(56) References Cited

U.S. PATENT DOCUMENTS

| | | | |
|---|---|---|---|
| 4,862,389 A | 8/1989 | Takagi | |
| 5,936,611 A * | 8/1999 | Yoshida | .......................... 345/158 |
| 6,006,161 A | 12/1999 | Katou | |
| 6,339,430 B1 * | 1/2002 | Takeshita | ...................... 345/592 |
| 7,725,903 B2 | 5/2010 | Kamiya et al. | |
| 2003/0100261 A1 * | 5/2003 | Gusler et al. | ...................... 455/18 |
| 2004/0128670 A1 * | 7/2004 | Robinson et al. | ................. 718/1 |
| 2005/0264702 A1 * | 12/2005 | Yoshii | .......................... 348/687 |
| 2006/0085755 A1 * | 4/2006 | Arai | .............................. 715/764 |
| 2006/0143666 A1 * | 6/2006 | Okada et al. | ..................... 725/89 |

FOREIGN PATENT DOCUMENTS

| | | |
|---|---|---|
| JP | 08050550 A | 2/1996 |
| JP | 2001-117750 A | 4/2001 |
| JP | 2003107986 A | 4/2003 |

OTHER PUBLICATIONS

Chengyuan Peng, Intergation of Applications into Digital Television Envirionment, 2001.*
European Search Report dated Jan. 18, 2007 (six (6) pages).
Notice of Reasons for Rejections issued for the counterpart JP application (Sep. 7, 2010) with English translation.

* cited by examiner

*Primary Examiner* — Lechi Truong
(74) *Attorney, Agent, or Firm* — Crowell & Moring LLP

(57) ABSTRACT

To improve operability of screen switching of native APs and virtual machine APs. It is an information processing device capable of executing native APs described in a native code and JavaAPs described in a Java (registered trademark) bytecode. A key event processing unit manages a current mode. It also decides display or non-display of each of images generated by the native APs and images generated by the Java APs according to the current mode which is managed. It further changes the current mode which is managed according to a type of a key event received from a key driver. A graphics driver superimposes and outputs the images decided to be displayed in predetermined order.

15 Claims, 18 Drawing Sheets

FIG. 7

| ITEM | STATE VALUE |
|---|---|
| MODE | ONE OF NAVIGATOR MODE, Java MODE, TV MODE, NAVIGATOR COLLABORATIVE Java MODE AND TV COLLABORATIVE Java MODE |
| OPERATION KEY FOCUS | ONE OF NAVIGATOR, Java AND TV |
| FUNCTION KEY FOCUS | ONE OF NAVIGATOR, Java AND TV |
| MAP DISPLAY LAYER | DISPLAY OR NON-DISPLAY |
| TV SCREEN DISPLAY LAYER | DISPLAY OR NON-DISPLAY |
| NAVIGATOR SCREEN DISPLAY LAYER | DISPLAY OR NON-DISPLAY |
| Java SCREEN DISPLAY LAYER | DISPLAY OR NON-DISPLAY |
| FUNCTION KEY DISPLAY LAYER | DISPLAY OR NON-DISPLAY |

| KEY CODE | KEY NAME | KEY TYPE | Java EVENT |
|---|---|---|---|
| 00 | DECIDE | OPERATION KEY | VK_ENTER |
| 01 | RETURN | OPERATION KEY | VK_ESCAPE |
| 02 | UP | OPERATION KEY | VK_UP |
| 03 | UPPER RIGHT | OPERATION KEY | VK_PAGE_UP |
| 04 | RIGHT | OPERATION KEY | VK_RIGHT |
| 05 | LOWER RIGHT | OPERATION KEY | VK_PAGE_DOWN |
| 06 | DOWN | OPERATION KEY | VK_DOWN |
| 07 | LOWER LEFT | OPERATION KEY | VK_END |
| 08 | LEFT | OPERATION KEY | VK_LEFT |
| 09 | UPPER LEFT | OPERATION KEY | VK_HOME |
| 10 | CURRENT POSITION | NAVIGATOR KEY | VK_F1 |
| 11 | TV | TV KEY | VK_F2 |
| 12 | Java | Java KEY | VK_F3 |
| 13 | F1 | FUNCTION KEY | VK_F4 |
| 14 | F2 | FUNCTION KEY | VK_F5 |
| 15 | F3 | FUNCTION KEY | VK_F6 |
| 16 | F4 | FUNCTION KEY | VK_F7 |
| 17 | F5 | FUNCTION KEY | VK_F8 |
| 18 | F6 | FUNCTION KEY | VK_F9 |

FIG. 9

| MODE 11231 | OPERATION KEY FOCUS 11232 | FUNCTION KEY FOCUS 11233 | MAP DISPLAY LAYER 11234 | TV DISPLAY LAYER 11235 | NAVIGATION DISPLAY LAYER 11236 | Java DISPLAY LAYER 11237 | FUNCTION KEY DISPLAY LAYER 11238 |
|---|---|---|---|---|---|---|---|
| NAVIGATOR MODE | NAVIGATOR | NAVIGATOR | DISPLAY | NON-DISPLAY | DISPLAY | NON-DISPLAY | DISPLAY |
| Java MODE | Java | Java | DISPLAY | NON-DISPLAY | NON-DISPLAY | DISPLAY | DISPLAY |
| TV MODE | TV | TV | DISPLAY | DISPLAY | NON-DISPLAY | NON-DISPLAY | DISPLAY |
| NAVIGATOR COLLABORATIVE Java MODE | Java | NAVIGATOR | DISPLAY | NON-DISPLAY | DISPLAY | DISPLAY | DISPLAY |
| TV COLLABORATIVE Java MODE | Java | NAVIGATOR | DISPLAY | DISPLAY | NON-DISPLAY | DISPLAY | DISPLAY |

| TASK TYPE | DESTINATION TASK ID | HIGH TASK PRIORITY | LOW TASK PRIORITY |
|---|---|---|---|
| NAVIGATOR | *** | 30 | 150 |
| TV | *** | 80 | 200 |
| Java | *** | 50 | 170 |

| MODE | DISPLAY TIME (SEC) | F1 | F2 | F3 | F4 | F5 | F6 |
|---|---|---|---|---|---|---|---|
| NAVIGATOR MODE | ** | WIDE AREA | DETAILS | 2-SCREEN | SETUP 1 | SETUP 2 | GUIDE |
| Java MODE | ** | STOP | SUSPEND | REPRO- DUCTION | PREVIOUS SONG | NEXT SONG | – |
| TV MODE | ** | BLUE | RED | GREEN | DATA BROADCAST | SETUP | YELLOW |
| NAVIGATOR COLLABORATIVE Java MODE | ** | WIDE AREA | DETAILS | 2-SCREEN | SETUP 1 | SETUP 2 | GUIDE |
| TV COLLABORATIVE Java MODE | ** | BLUE | RED | GREEN | DATA BROADCAST | SETUP | – |

INFORMATION PROCESSING DEVICE AND DISPLAY CONTROL METHOD

The present application claims priority from Japanese application JP2005-271741 filed on Sep. 20, 2005, the content of which is hereby incorporated by reference into this application.

BACKGROUND OF THE INVENTION

1. Field of the Invention

The present invention relates to a technique for controlling a display of an AP (Application Program) executed by an OS (Operating system) and a display of the AP executed by a VM (Virtual Machine) on an information processing device having the VM running on the OS.

2. Description of the Related Art

As for a car navigator or car navigation, it is important to assure a real-time processing as to an interrupt for obtaining vehicle information such as in-vehicle sensor data or GPS (Global Positioning System) data. For this reason, an AP for navigation is often run on an RTOS (Real Time OS) such as μITRON or VxWorks (registered trademark).

The AP for navigation should be described in a native code (a program code directly executable by an OS). In many cases, however, the AP described in the native code of the RTOS is more difficult to develop than the AP described in the code not dependent on the OS (called an AP for a VM) such as Java (registered trademark) in terms of fullness of development tools and the like. For this reason, JP-A-2001-117750 and so on propose a car navigation for running the VM on the RTOS and running the AP described in the code not dependent on the RTOS on the VM.

As for the car navigation, the RTOS normally performs layer management of displays of the AP for navigation and the VM so that the display of the VM is superimposed on the display of the AP for navigation. For this reason, there may be the following problem in the case of running the AP for navigation described in a native code and the AP for a VM simultaneously on the car navigation.

To be more specific, a user calls a menu of the AP for a VM by using an operation key assigned to the AP for a VM in a state where the AP for navigation has a navigation screen displayed by the RTOS. Consequently, the AP for a VM causes the RTOS to display a menu screen via the VM. The menu screen is superimposed and displayed on the navigation screen by layer management of the RTOS. Thereafter, the user sets the AP for navigation by using the operation key assigned to the AP for navigation. Normally, the user's operation for the operation key is only notified to the AP to which the operation key is assigned. For this reason, the AP for a VM cannot recognize that the AP for navigation was set. Consequently, the AP for a VM does not stop having the menu screen displayed by the RTOS via the VM. Therefore, even though the AP for navigation is set, the screen of the AP for a VM continues to be displayed on the navigation screen.

The present invention has been made in view of the circumstances, and an object thereof is to improve operability of screen switching of a native AP and a virtual machine AP.

SUMMARY OF THE INVENTION

To solve the problem, the present invention manages a mode of an information processing device, and decides a combination of screens to be shown on a display according to a current mode. And it introduces a flag called a focus for identifying an AP assigned to each individual key of an input device connected to the information processing device. It decides the focus of each individual key according to the current mode, and transmits a key event generated by operating one key to a task of the AP indicated by the focus of the key. Transition of the modes is implemented by the key event generated by a key operation of the input device or a notice from a predetermined AP which is started.

For instance, an information processing device of the present invention is the one capable of executing native APs which are application programs described in a native code and virtual machine APs which are application programs described in a virtual machine code, comprising:

state management means for managing a mode of the information processing device;

change processing means for deciding display or non-display of each of images generated by the native APs and images generated by the virtual machine APs according to the mode managed by the state management means; and output means for superimposing and outputting the images decided to be displayed by the change processing means in predetermined order, and wherein:

the change processing means changes the mode managed by the state management means according to a type of a key event generated by a key operation of an input device connected to the information processing device.

The present invention can improve operability of screen switching of a native AP and a virtual machine AP.

BRIEF DESCRIPTION OF THE DRAWING

FIG. 7 is a diagram schematically representing a state management table 1121;

FIG. 8 is a diagram schematically representing a key map management table 1122;

FIG. 9 is a diagram schematically representing a mode definition management table 1123;

FIG. 10 is a diagram schematically representing an event destination management table 1124;

FIG. 11 is a diagram schematically representing a function key assignment display management table 1125;

DETAILED DESCRIPTION OF THE INVENTION

Hereunder, an embodiment of the present invention will be described.

Figure 1:
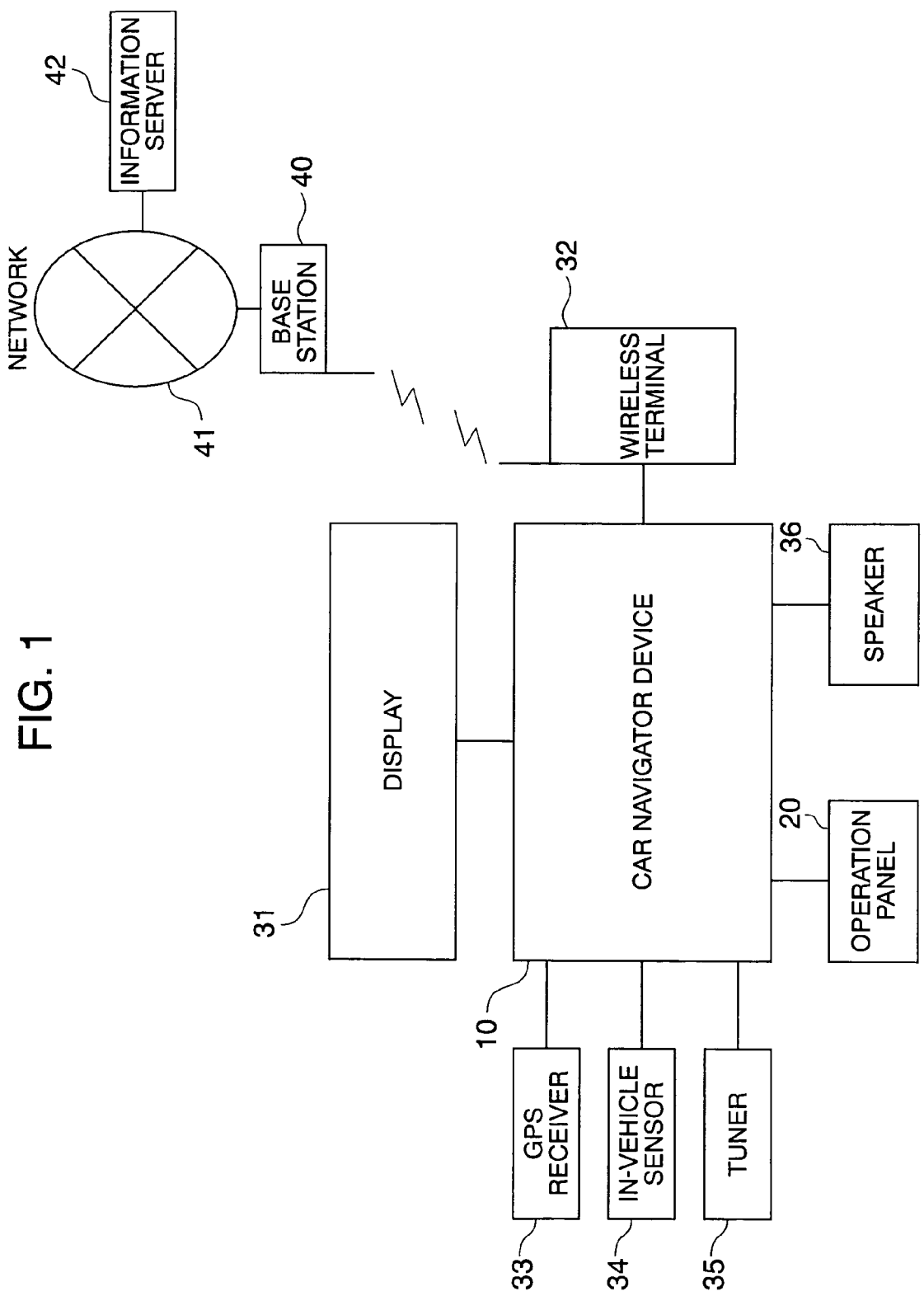
FIG. 1 is a schematic view of an in-vehicle navigation system to which an embodiment of the present invention is applied.

FIG. 1 is a schematic view of an in-vehicle navigation system to which an embodiment of the present invention is applied. As shown in FIG. 1, the in-vehicle navigation system includes a car navigator or car navigation device 10, an operation panel 20, a display 31 such as an LCD (Liquid Crystal Display), a wireless terminal 32 such as a cell phone, a GPS (Global Positioning System) receiver 33, an in-vehicle sensor 34 such as a speed sensor, a direction sensor or a gyro, a tuner 35 and a speaker 36.

The operation panel 20 receives various operations from a user, and transmits a signal according to received operation contents to the car navigation device 10.

Figure 2:
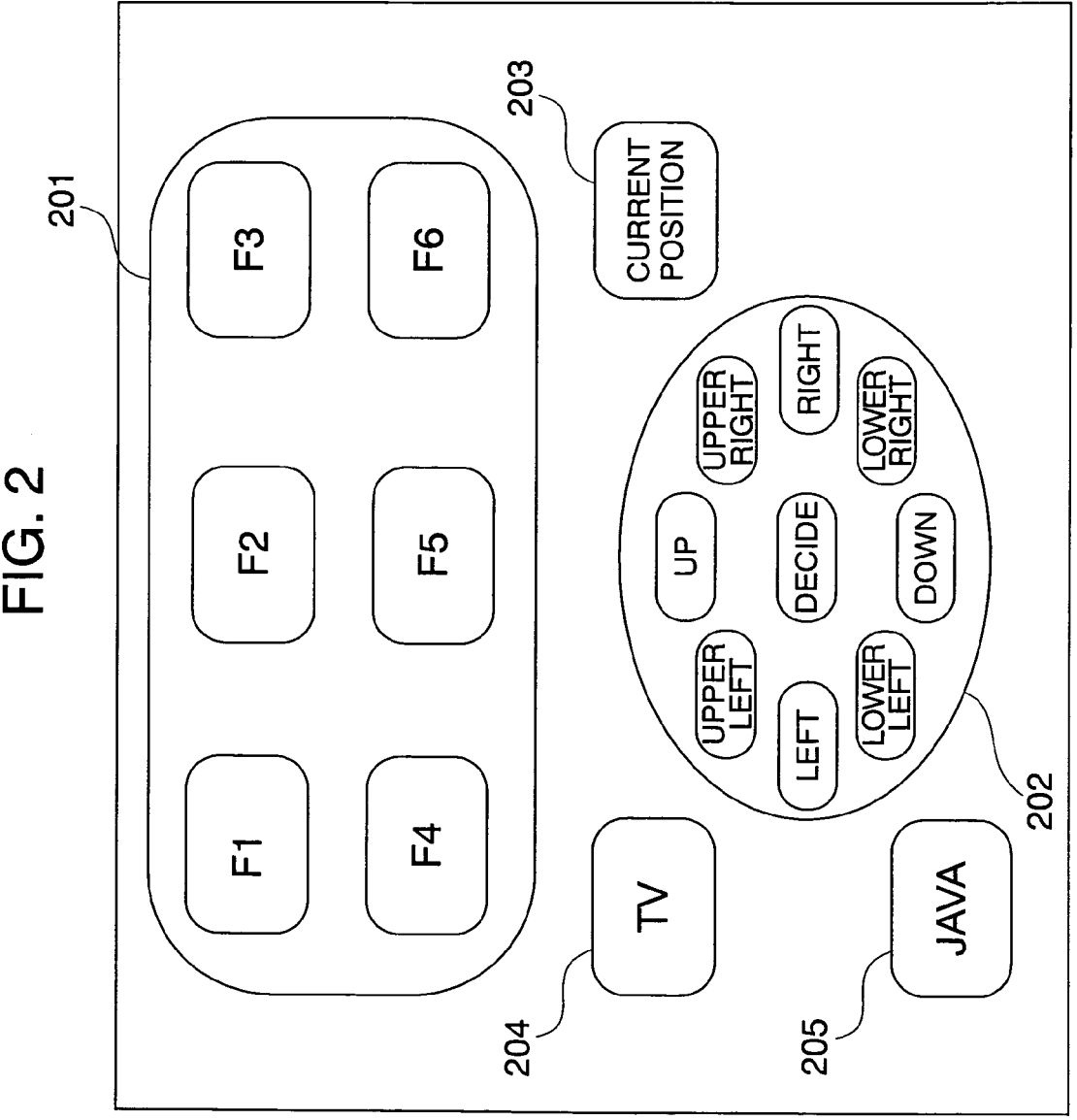
FIG. 2 is a schematic view of an operation panel 20.

FIG. 2 is a schematic view of the operation panel 20. As shown in FIG. 2, the operation panel 20 includes a function key switch group 201, an operation key switch group 202, a function key switch group 202, a current position key switch 203 for displaying a map of the vicinity of the current position, a TV key switch 204 for displaying television on the display 31, and a Java key switch 205 for displaying an operation menu of a Java AP on the display 31.

The function key switch group 201 is a switch group of key switches for ordering execution of specific functions. Here, an execution subject of the function key switch group 201 is different according to a mode described later.

The operation key switch group 202 is a switch group of key switches for ordering a decision on a moving direction of a cursor and an item to be pointed by the cursor. Here, as with the function key switch group 201, an operation subject of the operation key switch group 202 is different according to the mode described later.

The car navigation device 10 detects the current position by using GPS data outputted from the GPS receiver 33 and sensor data outputted from the in-vehicle sensor 34. It reads out map mesh data necessary for a map display from a map database not shown based on information about the detected current position. It develops the read map mesh data into graphics, and superimposes a mark indicating the current position thereon to display it on the display 31 (current position display process). The car navigation device 10 searches for an optimal route connecting the current position to a desired destination, superimposes this route on the map to display it on the display 31, and outputs an audio guidance from a speaker 37 so as to direct the user to the destination (route guidance process). The car navigation device 10 accesses an information server 42 by way of a base station 40 and a network (such as the Internet) 41 via a wireless terminal 32 to obtain desired information (such as POI (Point of Interest) information, traffic information on the vicinity of the current position, store information and music contents). And it displays the POI information, traffic information on the vicinity of the current position, store information and the like on the display 31, and reproduces the music contents to output them from the speaker 36 (information gathering process). The car navigation device 10 also processes a TV signal of a channel selected by a tuner 35 and outputs video and voice from the display 31 and speaker 36 (TV receiving process). The car navigation device 10 is a central unit for performing various processes other than the above-mentioned processes.

Figure 3:
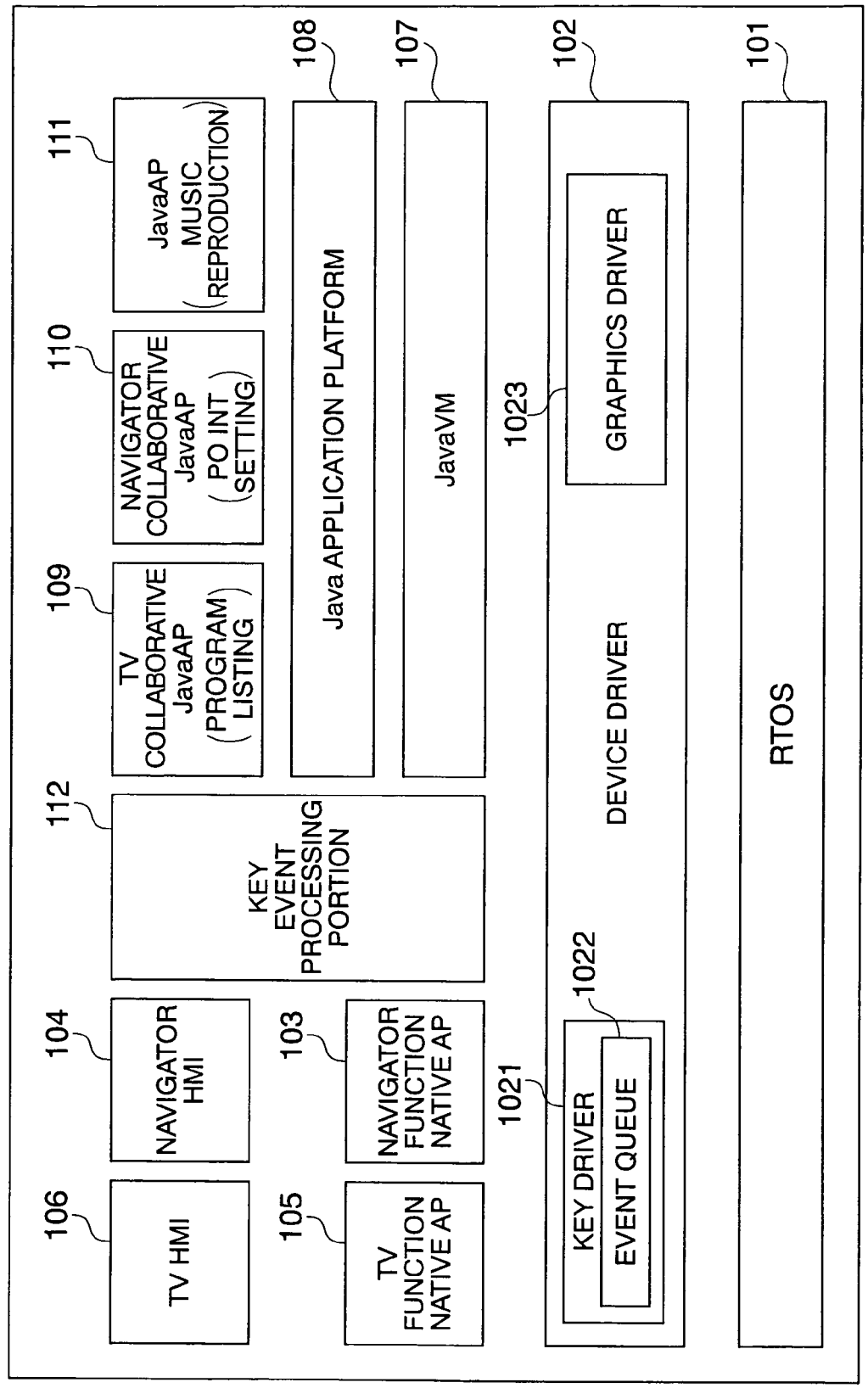
FIG. 3 is a software block diagram of the car navigation device 10.

FIG. 3 is a software block diagram of the car navigation device 10.

As shown in FIG. 3, the car navigation device 10 includes an RTOS 101 such as µITRON or VxWorks (registered trademark), a device driver 102, a navigation function native AP 103, a navigation HMI (Human Machine Interface) 104, a TV function native AP 105, a TV HMI 106, a Java VM 107, a Java application platform 108, a TV collaborative Java AP 109, a navigation collaborative Java AP 110 and a Java AP 111.

Both the navigation function native AP 103 and TV function native AP 105 are the native APs described in a native code directly executable by the RTOS 101.

The navigation function native AP 103 is a program for realizing the functions as the car navigation (current position display process, route guidance process). The TV function native AP 105 is a program for realizing the function as a TV receiver (TV receiving process).

The navigation HMI 104 is an HMI for using the functions provided by the navigation function native AP 103. An order for the navigation function native AP 103 inputted to the operation panel 20 is sent to the navigation HMI 104 via the RTOS 101 and device driver 102. The navigation HMI 104 notifies the navigation function native AP 103 of the received order.

The TV HMI 106 is an HMI for using the functions provided by the TV function native AP 105. An order for the TV function native AP 105 inputted to the operation panel 20 is sent to the TV HMI 106 via the RTOS 101 and device driver 102. The TV HMI 106 notifies the TV function native AP 105 of the received order.

The Java VM 107 is a program for rendering executable the Java AP described in a Java bytecode not directly executable by the RTOS 101. It is a native AP described in the native code directly executable by the RTOS 101. The Java VM 107 includes a library of an AWT (Abstract Windowing Toolkit), a native method interface, a Java bytecode interpreter and the like. The AWT is a window toolkit for realizing a GUI (Graphical User Interface) in Java. It holds GUI parts such as frames, buttons, pull-down menus and text boxes, which can be combined to configure an application. The native method interface is an interface for calling the native AP from the Java AP or calling the Java AP from the native AP. The Java bytecode interpreter interprets and executes the Java bytecode.

The Java application platform 108 is a platform for allowing the Java VM 107 to execute various JavaAPs. As for the Java application platform 108, there is a proposed one based on a specification laid down by the OSGi (Open Services Gateway Initiative) in consortiums such as the AMI-C and IIC.

All of the TV collaborative Java AP 109, navigation collaborative Java AP 110 and Java AP 111 are the JavaAPs described in the Java bytecode.

The TV collaborative Java AP 109 performs processing in collaboration with the TV function native AP 105. To be more precise, it accesses the information server 42 and obtains program listing data, which is presented to the user to select a desired program. And it notifies the TV function native AP 105 of the selected program. Consequently, the TV function native AP 105 controls the tuner 35 to select the notified program, and demodulates a TV broadcast signal received by the tuner 35 to output it from the display 31 and speaker 36.

The navigation collaborative Java AP 110 performs processing in collaboration with the navigation function native AP 103. To be more precise, it accesses the information server 42 and obtains the POI information, which is presented to the user to select desired POI information. And it notifies the navigation function native AP 103 of the selected POI information. Consequently, the navigation function native AP 103 performs point registration of a point specified by the notified POI information.

The Java AP 111 is an application for reproducing music contents. To be more precise, it accesses the information server 42 and obtains a song list, which is presented to the user to select desired music contents. It downloads the selected music contents from the information server 42 and outputs them from the speaker 36.

The device driver 102 is a driver for the RTOS 101 to control the units of the car navigation device 10 and exchange information with the devices connected to the car navigation device 10. As shown in FIG. 3, it includes a key driver 1021 and a graphics driver 1023.

Figure 4:
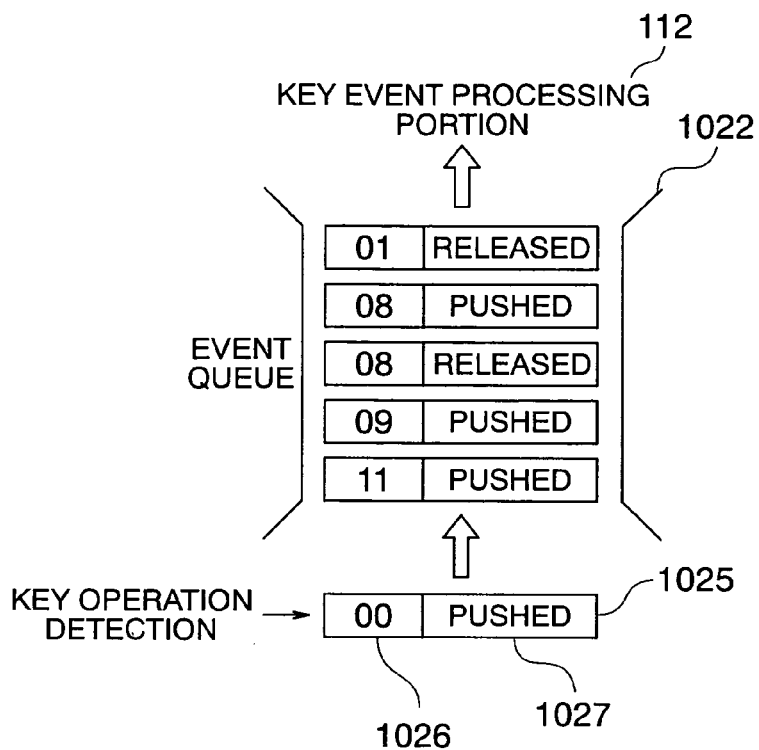
FIG. 4 is a diagram for describing a key driver 1021.

As shown in FIG. 4, in the case where one of the keys on the operation panel 20 is operated, the key driver 1021 generates event data 1025 including a key code 1026 assigned to the key and a state of the key (either a pressed state or a released state) 1027 and stores it in an event queue 1022. The key driver 1021 takes out the event data 1025 in order from the one stored in the event queue 1022 earliest, and transmits it to a key event processing unit 112.

Figure 5:
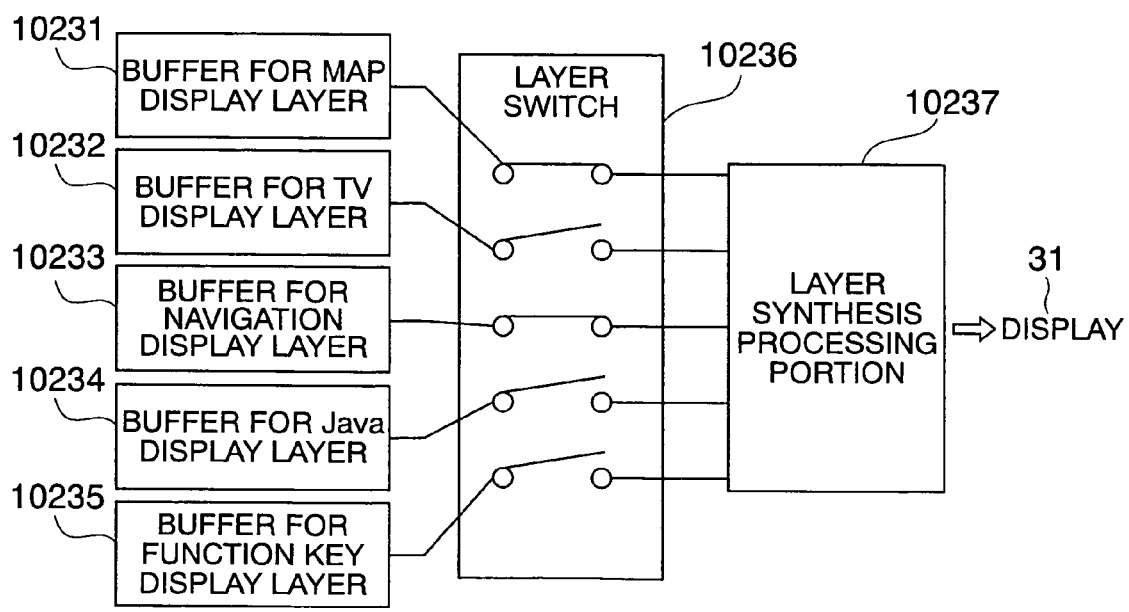
FIG. 5 is a diagram for describing a graphics driver 1023.

As shown in FIG. 5, the graphics driver 1023 includes multiple buffers for layers 10231 to 10235, a layer switch 10236 and a layer synthesis processing unit 10237. The buffers for layers 10231 to 10235 are frame buffers for buffering images generated by the AP (or function) assigned in advance. The example shown in FIG. 5 includes a buffer for a map display layer 10231 for buffering a map image generated by a map display function of the navigation function native AP 103, a buffer for a TV display layer 10232 for buffering a TV screen image generated by the TV function native AP 105, a buffer for a navigation display layer 10233 for buffering a navigation screen image generated by the navigation function native AP 103, a buffer for a Java display layer 10234 for buffering an image (Java screen image) generated by the Java VM 107, and a buffer for a function key display layer 10235 for buffering a screen image of a function key assignment display menu generated by the key event processing unit 112 described later.

The layer switch 10236 turns on and off outputs of the images buffered in each of the buffers for layers 10231 to 10235. It follows orders from the key event processing unit 112 described later as to the outputs of which images should be turned on and off.

The layer synthesis processing unit 10237 synthesizes the images outputted from the layer switch 10236 by superimposing them in the order given to the buffers for layers 10231 to 10235 having buffered the images. And it outputs the synthetic image to the display 31.

The key event processing unit 112 receives event data from the key driver 1021, and transmits the event data to an event destination determined according to the mode at the time. The key event processing unit 112 also determines necessity of change of the mode based on the received event data. If determined that the change is necessary, it changes the mode and outputs an order to the graphics driver 1023 so as to display only the layer determined according to the changed mode on the display 31.

Figure 6:
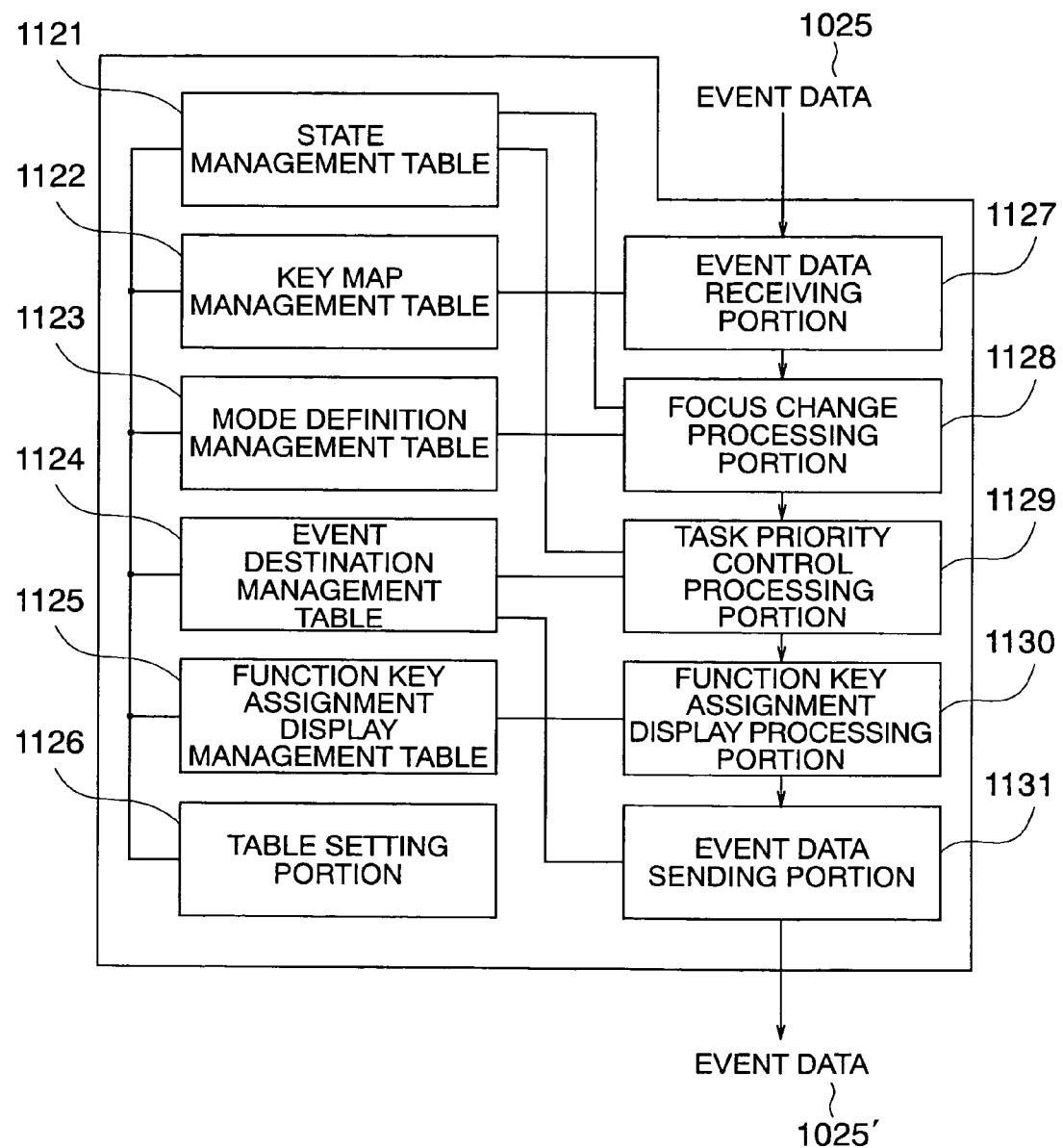
FIG. 6 is a schematic view of a key event processing unit 112.

FIG. 6 is a schematic view of the key event processing unit 112.

As shown in FIG. 6, the key event processing unit 112 includes a state management table 1121, a key map management table 1122, a mode definition management table 1123, an event destination management table 1124, a function key assignment display management table 1125, a table setting unit 1126, an event data receiving unit 1127, a focus change processing unit 1128, a task priority control processing unit 1129, a function key assignment display processing unit 1130 and a event data sending unit 1131.

The state management table 1121 is a table for managing a current state of the car navigation device 10. FIG. 7 is a diagram schematically representing the state management table 1121. As shown in FIG. 7, the state management table 1121 is provided with a record 11210 by item for managing the state. The record 11210 includes a field 11211 for registering the item to be managed and a field 11212 for registering a state value of the item.

As for the items to be registered with the field 11211, this embodiment has prepared a "mode," an "operation key focus," a "function key focus," a "map display layer," a "TV screen layer," a "navigation screen layer," a "Java screen layer" and a "function key display layer."

Here, the item "mode" is an operation mode of the car navigation device 10 determined by an application which is active (in operation). As for the modes, this embodiment provides a "navigation mode" in which only the navigation function native AP 103 is active, a "Java mode" in which only the Java AP 111 is active, a "TV mode" in which only the TV function native AP 105 is active, a "navigation collaborative Java mode" in which the navigation function native AP 103 and the navigation collaborative Java AP 110 are active, and a "TV collaborative Java mode" in which the TV function native AP 105 and the TV collaborative Java AP 109 are active. Therefore, one of the "navigation mode," "Java mode," "TV mode," "navigation collaborative Java mode" and "TV collaborative Java mode" is registered with the field 11212 of the record 11210 of the item "mode."

The item "operation key focus" is a flag indicating the AP assigned to the operation key switch group 202. As described above, the operation key switch group 202 has a different AP as the operation subject according to the mode. As for the "operation key focuses," this embodiment provides a "navigation" indicating the state of having the navigation function native AP 103 assigned, a "TV" indicating the state of having the TV function native AP 105 assigned, and a "Java" indicating the state of having one of the JavaAPs 109 to 111 assigned. Therefore, one of the "navigation," "TV" and "Java" is registered with the field 11212 of the record 11210 of the item "operation key focus."

The item "function key focus" is a flag indicating the AP assigned to the function key group 201. As with the operation key switch group 202, the function key switch group 201 has different APs as the execution subjects according to the modes as described above. As for the "function key focuses," this embodiment provides a "navigation" indicating the state of having the navigation function native AP 103 assigned, a "TV" indicating the state of having the TV function native AP 105 assigned, and a "Java" indicating the state of having one of the JavaAPs 109 to 111 assigned. Therefore, one of the "navigation," "TV" and "Java" is registered with the field 11212 of the record 11210 of the item "function key focus."

The item "map display layer" is image data (map data generated by the navigation function native AP 103) stored in the buffer for a map display layer 10231 of the graphics driver 1023. In the case of displaying the image data on the layer switch 10236 of the graphics driver 1023, "display" is registered with the field 11212 of the record 11210 of the item "map display layer." In the case of not displaying it, "non-display" is registered with the field 11212.

The item "TV screen layer" is the image data (TV screen data generated by the TV function native AP 105) stored in the buffer for a TV screen display layer 10232 of the graphics driver 1023. In the case of displaying the image data on the layer switch 10236 of the graphics driver 1023, "display" is registered with the field 11212 of the record 11210 of the item "TV screen layer." In the case of not displaying it, "non-display" is registered with the field 11212.

The item "navigation screen layer" is image data (navigation screen data other than the map data generated by the navigation function native AP 103) stored in the buffer for a navigation screen display layer 10233 of the graphics driver 1023. In the case of displaying the image data on the layer switch 10236 of the graphics driver 1023, "display" is registered with the field 11212 of the record 11210 of the item "navigation screen layer." In the case of not displaying it, "non-display" is registered with the field 11212.

The item "Java screen layer" is image data (Java screen data generated by one of the JavaAPs 109 to 111) stored in the buffer for a Java screen display layer 10234 of the graphics driver 1023. In the case of displaying the image data on the layer switch 10236 of the graphics driver 1023, "display" is registered with the field 11212 of the record 11210 of the item "Java screen layer." In the case of not displaying it, "non-display" is registered with the field 11212.

The item "function key display layer" is image data (menu screen data on the function keys generated by the key event processing unit 112) stored in the buffer for a function key display layer 10235 of the graphics driver 1023. In the case of displaying the image data on the layer switch 10236 of the graphics driver 1023, "display" is registered with the field 11212 of the record 11210 of the item "function key display layer." In the case of not displaying it, "non-display" is registered with the field 11212.

The key map management table 1122 is a table which manages a key map for deciding the type of an operated key and a Java event in the case where the JavaAPs 109 to 111 are assigned to the operated key from the key code 1026 of the event data 1025. FIG. 8 is a diagram schematically representing the key map management table 1122. As shown in FIG. 8, the key map management table 1122 is provided with a record 11220 by key code assigned to each of the key switches of the operation panel 20. The record 11220 includes a field 11221 for registering the key code, a field 11222 for registering the name of the key switch having the key code assigned thereto, a field 11223 for registering a key type of the key switch having the key code assigned thereto, and a field 11224 for registering the Java event to be assigned to the key switch in the case where the JavaAPs 109 to 111 are assigned to the key switch having the key code assigned thereto.

As for the key types, this embodiment has prepared a "function key" indicating that it belongs to one of the function key switch group 201, an "operation key" indicating that it belongs to one of the operation key switch group 202, a "navigation key" indicating that it is the current position key switch 203 for displaying the map of the vicinity of the current position, a "TV key" indicating that it is the TV key switch 204 for displaying television on the display 31, and a "Java key" indicating that it is the Java key switch 205 for displaying the operation menu of the JavaAPs 109 to 111 on the display 31 (refer to FIG. 2). As for the Java event, this embodiment uses the same one as the event defined in the "java.awt.event.KeyEvent" class.

The mode definition management table 1123 is a table for defining an operational state of the car navigation device 10 in each of the modes. FIG. 9 is a diagram schematically representing the mode definition management table 1123. As shown in FIG. 9, the mode definition management table 1123 is provided with a record 11230 by mode. The record 11230 includes a field 11231 for registering the mode, a field 11232 for registering the operation key focus in the mode, a field 11233 for registering the function key focus in the mode, a field 11234 for registering display/non-display of the map display layer in the mode, a field 11235 for registering display/non-display of the TV display layer in the mode, a field 11236 for registering display/non-display of the navigation display layer in the mode, a field 11237 for registering display/non-display of the Java display layer in the mode, and a field 11238 for registering display/non-display of the function key display layer in the mode.

The event destination management table 1124 is a table for managing a destination task ID of the event data 1025 and task priority thereof. A destination task has an event queue for receiving events. In the event destination management table 1124, the task ID is an ID given to the task for the sake of managing the task in the RTOS 101. The destination of the event data 1025 is decided by the task ID. The task priority is the information indicating the order of tasks to which the event data 1025 should be preferentially transmitted. The smaller the number is, the higher the priority becomes. FIG. 10 is a diagram schematically representing the event destination management table 1124. As shown in FIG. 10, the event destination management table 1124 is provided with a record 11240 by task type. The record 11240 includes a field 11241 for registering the task type, a field 11242 for registering the destination task ID, a field 11243 for registering high task priority, and a field 11244 for registering low task priority.

As for the task types, there are a "navigation" indicating what the navigation function native AP 103 should process, a "TV" indicating what the TV function native AP 105 should process, and a "Java" indicating what the JavaAPs 109 to 111 should process. The high task priority is the task priority set to the task when changing the task priority of the task ID registered with the field 11241 to "high." The low task priority is the task priority set to the task when changing the task priority of the task ID registered with the field 11241 to "low."

The function key assignment display management table 1125 is a table for managing character string data of the key switches of the function key switch group 201, which is displayed on menu screen data of the function keys by mode. FIG. 11 is a diagram schematically representing the function key assignment display management table 1125. As shown in FIG. 11, the function key assignment display management table 1125 is provided with a record 11250 by mode. The record 11250 includes a field 11251 for registering the mode, a field 11252 for registering display time of the menu screen data of the function keys, and fields 11253 to 11258 for registering character strings to be displayed correspondingly to key switches F1 to F6 of the function key switch group 201.

The description will be continued by returning to FIG. 6. The table setting unit 1126 changes the contents of the management tables 1121 to 1125 according to the order received from the AP via the RTOS 101.

The event data receiving unit 1127 obtains the event data 1025 from the event queue 1022 of the key driver 1021. The focus change processing unit 1128 changes the registered contents of the state management table 1121 according to the event data 1025 received by the event data receiving unit 1127. The task priority control processing unit 1129 changes the task priority of the task managed by the RTOS 101. The function key assignment display processing unit 1130 updates the menu screen data (image data) of the function keys to be stored in the buffer for a function key display layer of the graphics driver 1023 according to the event data 1025 received in the event data receiving unit 1127.

Figure 12:
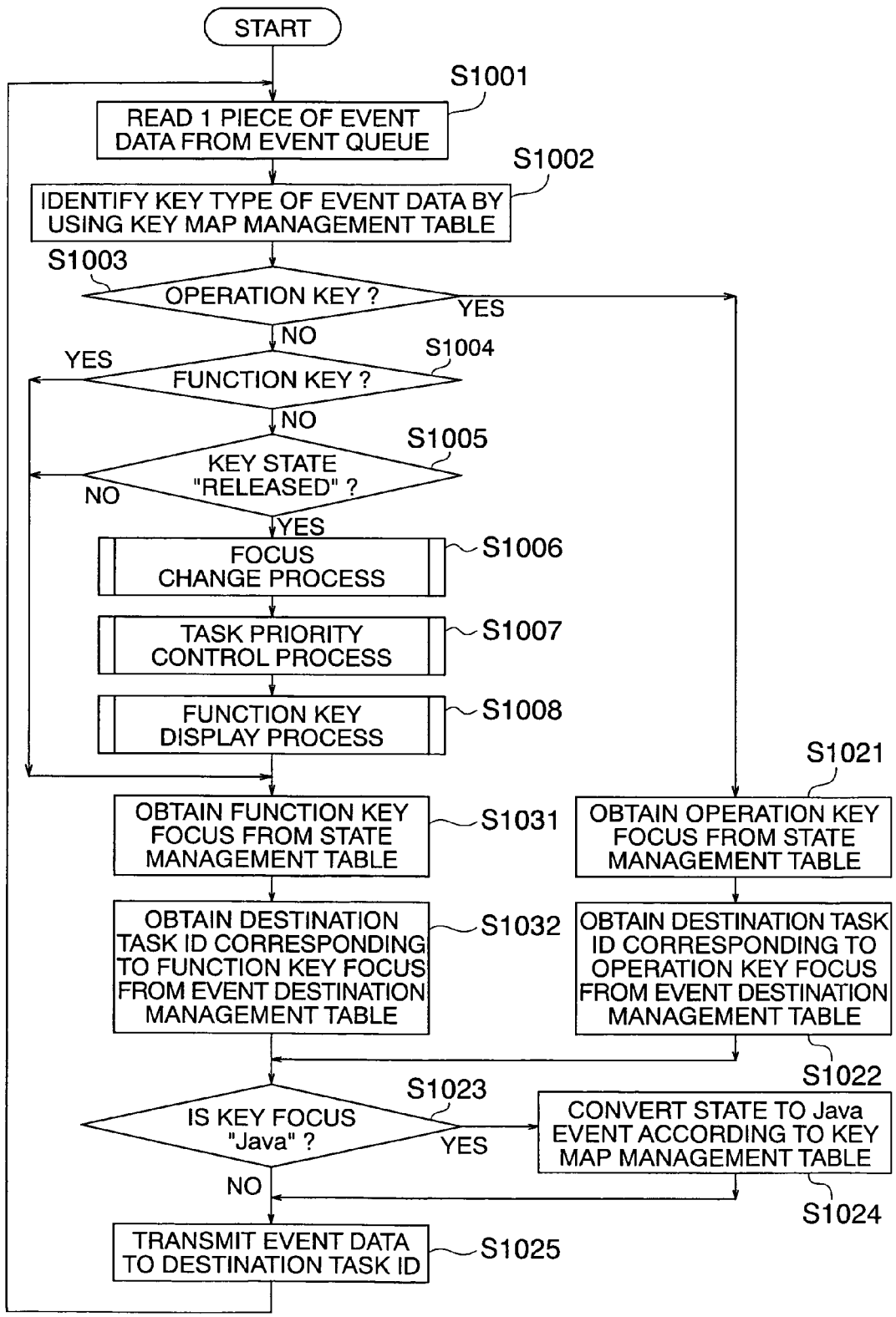
FIG. 12 is a diagram for describing an operation flow of a key event processing unit 112.

FIG. 12 is a diagram for describing an operation flow of the key event processing unit 112.

First, the event data receiving unit 1127 reads one piece of the event data 1025 stored in the event queue 1022 of the key driver 1021 in sequence (S1001). Next, the event data receiving unit 1127 refers to the key map management table 1122, and searches for the record 11220 in which the key code 1026 of the event data 1025 read from the event queue 1022 is registered with the field 11221. And it identifies the key type registered with the field 11223 of the record 11220 searched for (S1002).

Thereafter, the event data receiving unit 1127 examines whether or not the identified key type is the "operation key." If the "operation key" (YES in S1003), it moves on to S1021. If not the "operation key" (NO in S1003), it moves on to S1004.

In S1004, the event data receiving unit 1127 examines whether or not the identified key type is the "function key." If the "function key" (YES in S1004), it moves on to S1031. If not the "function key" (NO in S1004), it moves on to S1005.

In S1005, the event data receiving unit 1127 examines whether or not the state 1027 of the event data 1025 read from the event queue 1022 is "released." If the state 1027 is "released" (YES in S1005), it moves on to S1006. If not "released" (NO in S1004), it moves on to S1031.

In S1006, the focus change processing unit 1128 changes the mode by performing focus change processing described later. Next, in S1007, the task priority control processing unit 1129 changes the task priority by exerting task priority control described later. In S1008 thereafter, the function key assignment display processing unit 1130 performs a function key display process described later to perform assignment display of the function keys. Thereafter, it moves on to S1031.

In S1021, the event data sending unit 1131 accesses the state management table 1121 and searches the record 11210 in which the item "operation key focus" is registered with the field 11211 so as to acquire the state value of the operation key focus registered with the field 11212 of the searched record 11210. Next, the event data sending unit 1131 accesses the event destination management table 1124, and searches for the record 11240 in which the task type corresponding to the state value of the operation key focus acquired in S1021 is registered with the field 11241 so as to acquire the destination task ID registered with the field 11242 of the searched record 11240 (S1022). Thereafter, it moves on to S1023.

In S1031, the event data sending unit 1131 accesses the state management table 1121 and searches the record 11210 in which the item "function key focus" is registered with the field 11211 so as to acquire the state value of the function key focus registered with the field 11212 of the searched record 11210. Next, the event data sending unit 1131 accesses the event destination management table 1124, and searches the record 11240 in which the task type corresponding to the state value of the function key focus acquired in S10321 is registered with the field 11241 so as to acquire the destination task ID registered with the field 11242 of the searched record 11240 (S1032). Thereafter, it moves on to S1023.

In S1023, the event data sending unit 1131 examines whether or not the state values of the key focuses acquired in S1021 and S1031 are "Java." In the case where the state values of the key focuses are "Java" (YES in S1023), the event data sending unit 1131 accesses the key map management table 1122 and searches the record 1220 in which the key code 1026 of the event data 1025 read from the event queue 1022 is registered with the field 11221. And it converts the contents registered with the state 1027 of the event data 1025 to the Java event registered with the field 11224 of the searched record 11220 (S1024). Thereafter, it moves on to S1025. In the case where the state values of the key focuses are not "Java" (NO in S1023), it moves on to S1025 at once.

In S1025, the event data sending unit 1131 transmits the event data 1025 to the destination task ID obtained in S1022 and S1032 of the RTOS 101. Thereafter, it returns to S1001.

Figure 13:
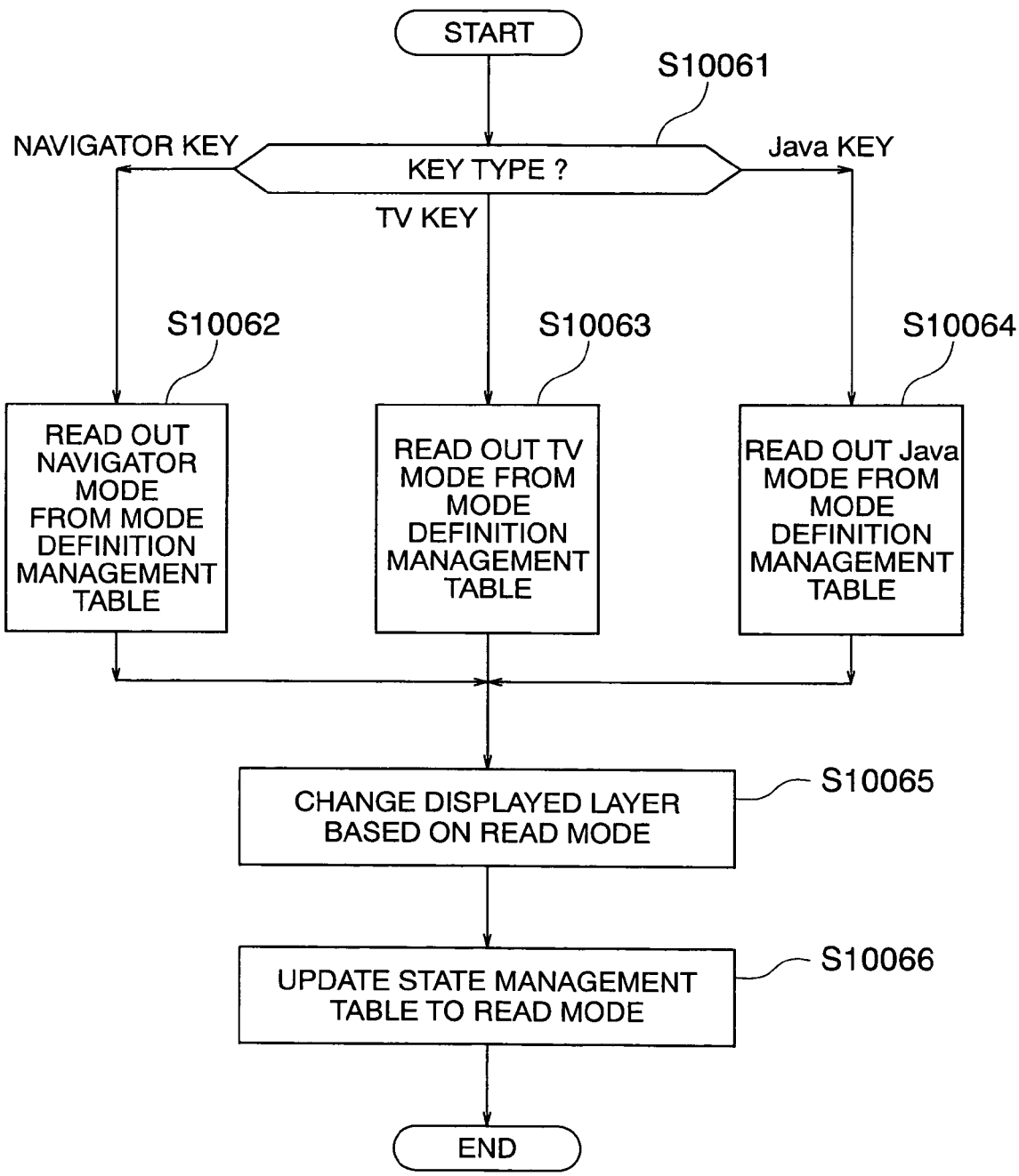
FIG. 13 is a diagram for describing a focus change process (S1006 of FIG. 12)

FIG. 13 is a diagram for describing a focus change process (S1006 of FIG. 12).

The focus change processing unit 1128 examines the identified key type in S1002 of FIG. 12 (S10061). In the case where the key type is the "navigation key," it moves on to S10062. In the case of the "TV key," it moves on to S10063. And in the case of the "Java key," it moves on to S10064.

In S10062, the focus change processing unit 1128 accesses the mode definition management table 1123, and reads out the record 11230 in which the "navigation mode" is registered with the field 11231. Thereafter, it moves on to S10065.

In S10063, the focus change processing unit 1128 accesses the mode definition management table 1123, and reads out the record 11230 in which the "TV mode" is registered with the field 11231. Thereafter, it moves on to S10065.

In S10064, the focus change processing unit 1128 accesses the mode definition management table 1123, and reads out the record 11230 in which the "Java mode" is registered with the field 11231. Thereafter, it moves on to S10065.

In S10065, the focus change processing unit 1128 notifies the graphics driver 1023 of the layers to be displayed according to the fields 11234 to 11238 of the record 11230 read out in S10062 to S10064. To be more precise, it notifies the graphics driver 1023 of the layers corresponding to the fields in which "display" is stored out of the fields 11234 to 11238. Consequently, the layer switch 10236 of the graphics driver 1023 connects the buffers 10231 to 10235 corresponding to the layers of which "display" is notified to the layer synthesis processing unit 10237.

Lastly, the focus change processing unit 1128 changes the registered contents in the state management table 1121 to the registered contents of the record 11230 read in S10062 to S10064 (S10066).

Figure 14:
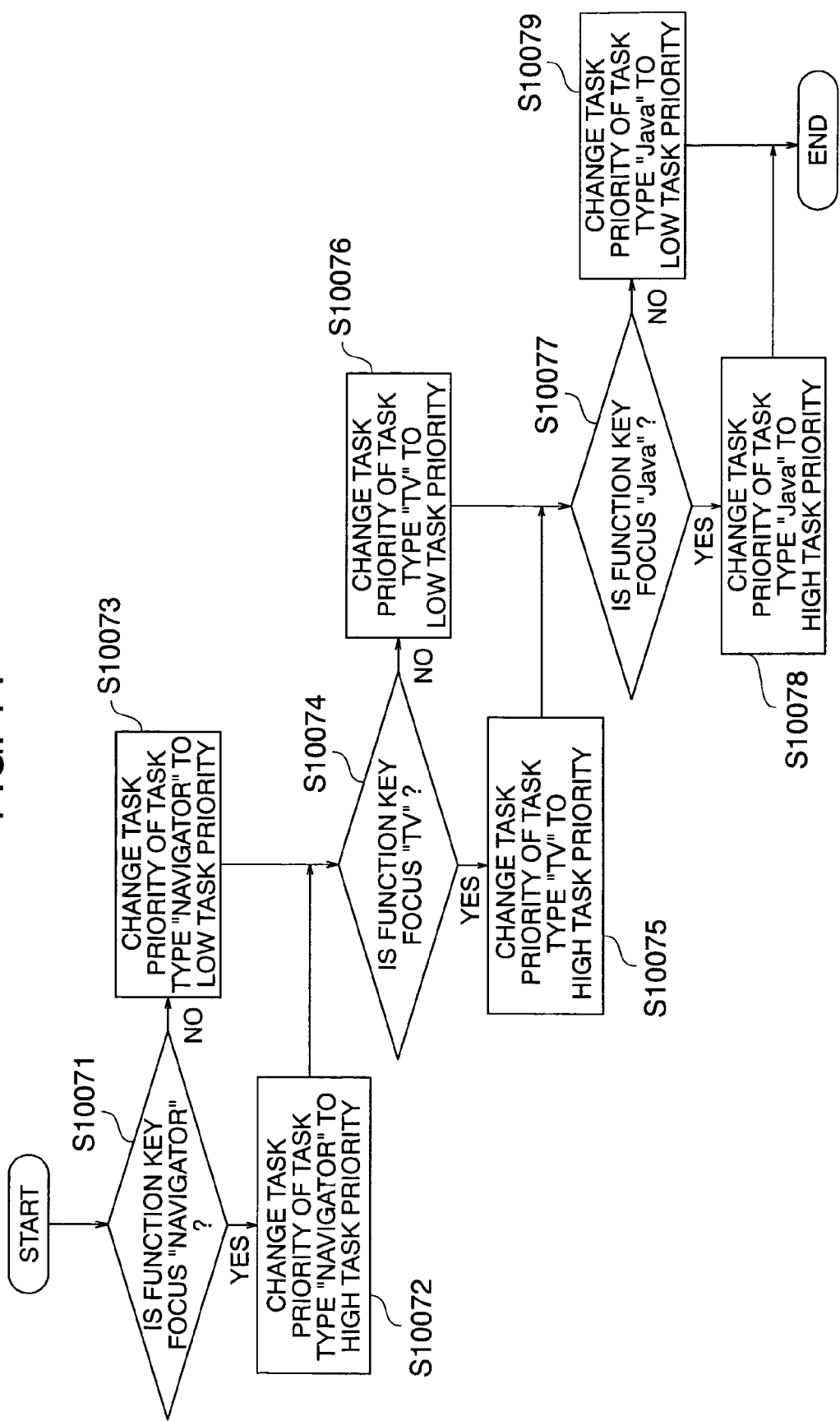
FIG. 14 is a diagram for describing a task priority control process (S1007 of FIG. 12)

FIG. 14 is a diagram for describing a task priority control process (S1007 of FIG. 12).

First, the task priority control unit 1129 obtains the function key focus from the state management table 1121. And it examines whether or not the obtained function key focus is the "navigation" (S10071). In the case where it is the "navigation" (YES in S10071), the task priority control processing unit 1129 changes the task priority of the task of the task type "navigation" out of the tasks managed by the RTOS 101 to the high task priority registered with the field 1243 of the record 11240 in which the task type "navigation" is registered with the field 11241 of the event destination management table 1124 (S10072). In the case where it is not the "navigation" (NO in S10072), the task priority control processing unit 1129 changes the task priority of the task of the task type "navigation" out of the tasks managed by the RTOS 101 to the low task priority registered with the field 1244 of the record 11240 in which the task type "navigation" is registered with the field 11241 of the event destination management table 1124 (S10073).

The task priority control processing unit 1129 also examines whether or not the obtained function key focus is the "TV" (S10074). In the case where it is the "TV" (YES in S10074), the task priority control processing unit 1129 changes the task priority of the task of the task type "TV" out of the tasks managed by the RTOS 101 to the high task priority registered with the field 1243 of the record 11240 in which the task type "TV" is registered with the field 11241 of the event destination management table 1124 (S10075). In the case where it is not the "TV" (NO in S10074), the task priority control processing unit 1129 changes the task priority of the task of the task type "TV" out of the tasks managed by the RTOS 101 to the low task priority registered with the field 1244 of the record 11240 in which the task type "TV" is registered with the field 11241 of the event destination management table 1124 (S10076).

The task priority control processing unit 1129 further examines whether or not the obtained function key focus is "Java" (S10077). In the case where it is "Java" (YES in S10077), the task priority control processing unit 1129 changes the task priority of the task of the task type "Java" out of the tasks managed by the RTOS 101 to the high task priority registered with the field 1243 of the record 11240 in which the task type "Java" is registered with the field 11241 of the event destination management table 1124 (S10078). In the case where it is not the "Java" (NO in S10077), the task priority control processing unit 1129 changes the task priority of the task of the task type "Java" out of the tasks managed by the RTOS 101 to the low task priority registered with the field 1244 of the record 11240 in which the task type "Java" is registered with the field 11241 of the event destination management table 1124 (S10079).

Figure 15:
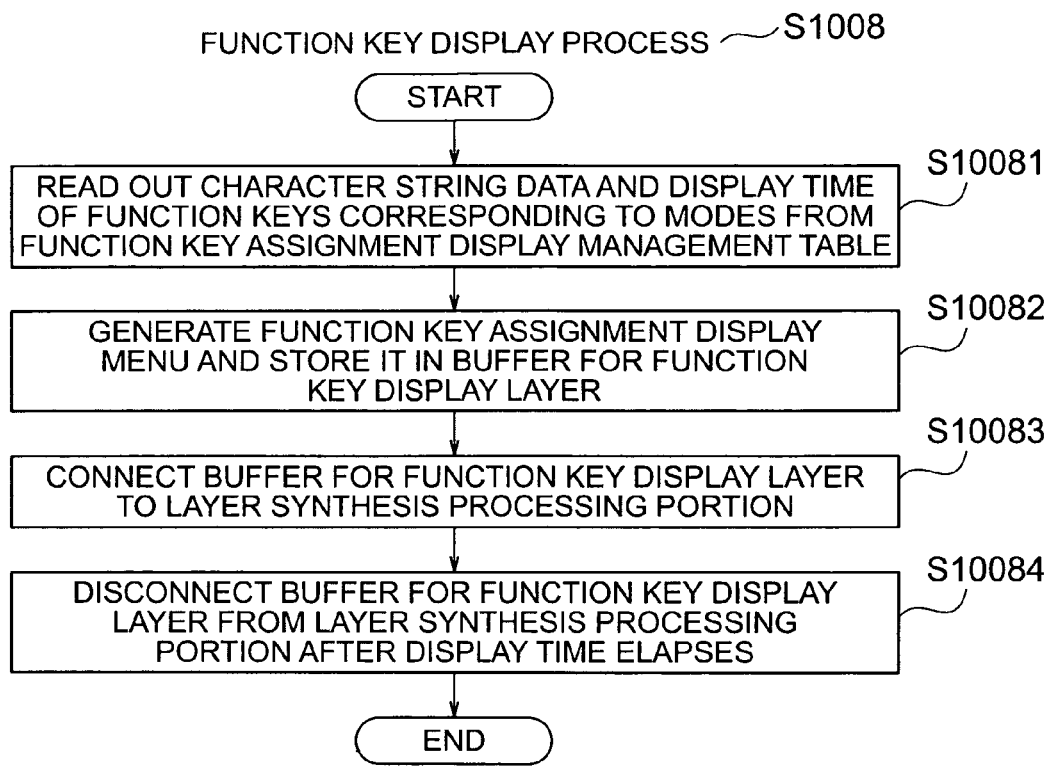
FIG. 15 is a diagram for describing a function key display process (S1008 of FIG. 12)

FIG. 15 is a diagram for describing the function key display process (S1008 of FIG. 12).

First, the function key assignment display processing unit 1130 obtains the mode from the state management table 1121. Next, it accesses the function key assignment display management table 1125, and searches the record 11250 in which the obtained mode is registered with the field 11251 (S10081).

Next, the function key assignment display processing unit 1130 generates the function key assignment display menu by using the character string data of the key switches F1 to F6 registered with the fields 11253 to 11258 of the searched record 11250. And it stores the generated menu (image data) in the buffer for a function key display layer 10235 of the graphics driver 1023 (S10082).

Thereafter, the function key assignment display processing unit 1130 controls the layer switch 10236 of the graphics driver 1023, and connects the buffer for a function key display layer 10235 to the layer synthesis processing unit 10237 (S10083). Thus, the layer synthesis processing unit 10237 superimposes the function key assignment display menu stored in the buffer for a function key display layer 10235 on the image data of the other buffers 10231 to 10234 connected by the layer switch 10236 so as to display the image on the display 31.

Figure 16:
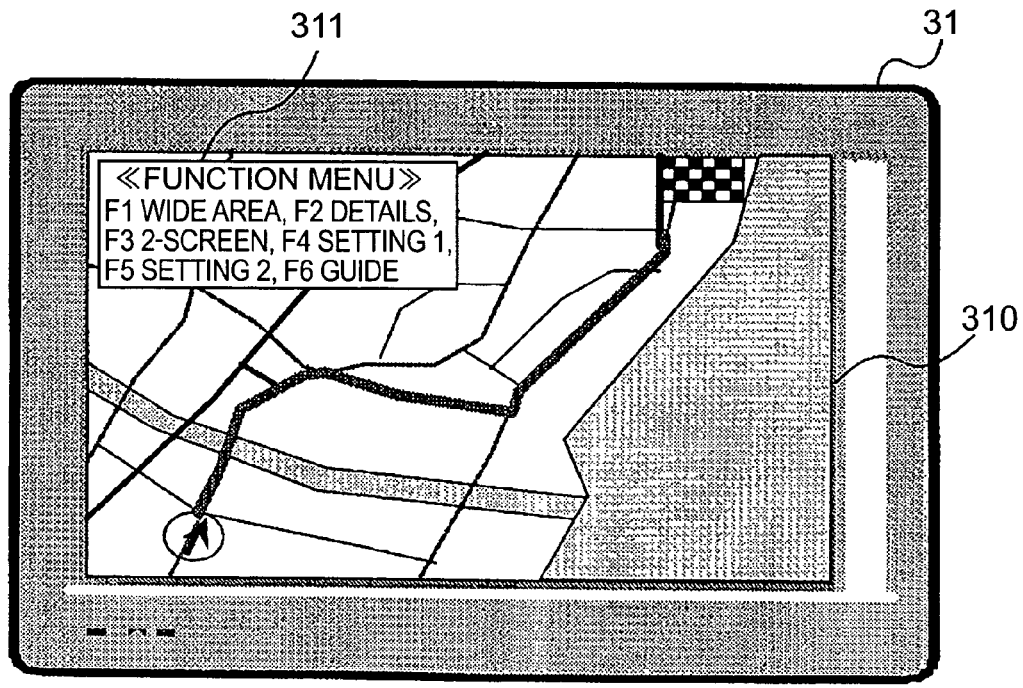
FIG. 16 is a diagram showing an example of a display menu of function key assignment display in the case of a mode "navigation mode"

FIG. 16 is a diagram showing an example of the display menu of the function key assignment display in the case of the mode "navigation mode." As shown in FIG. 16, map data (map display layer) 310 is displayed on the display 31, and a function key assignment display menu 311 in which the character string data of the function keys corresponding to the "navigation mode" is described is displayed thereon.

Figure 17:
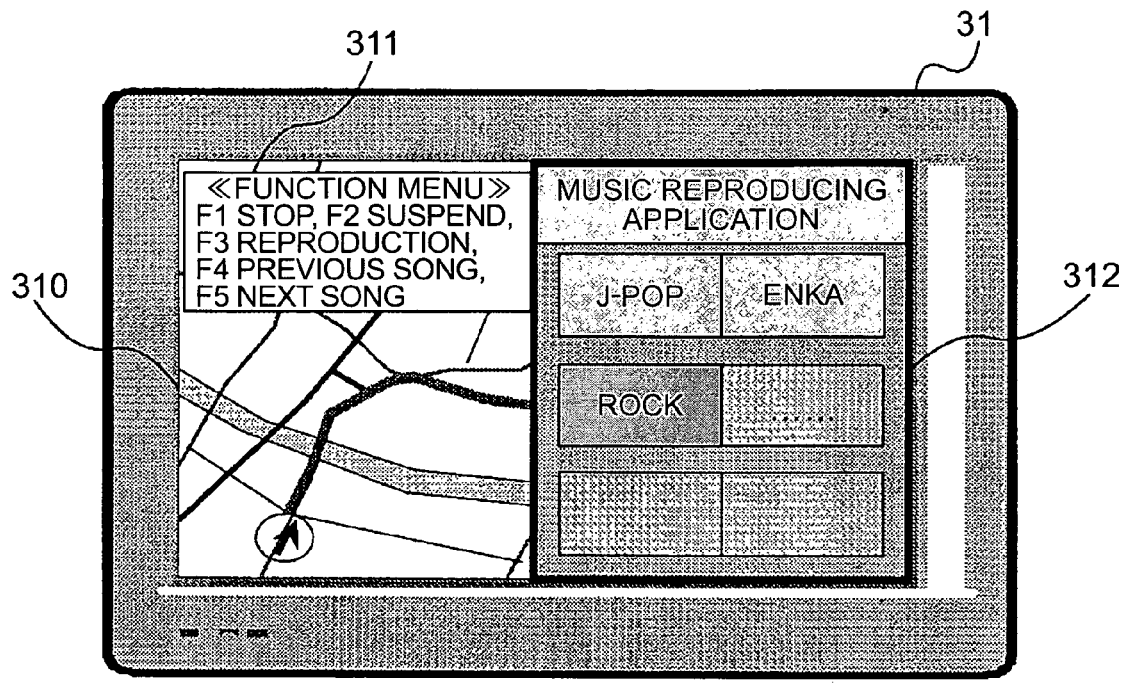
FIG. 17 is a diagram showing an example of the display menu of the function key assignment display in the case of a mode "Java mode"

FIG. 17 is a diagram showing an example of the display menu of the function key assignment display in the case of the mode "Java mode." As shown in FIG. 17, the map data (map display layer) 310 is displayed on the display 31, and a menu screen (Java screen layer) 312 of the Java AP (music reproducing application) and the display menu 311 of the function key assignment display in which the character string data of the function keys corresponding to the "Java mode" is described are displayed thereon.

Figure 18:
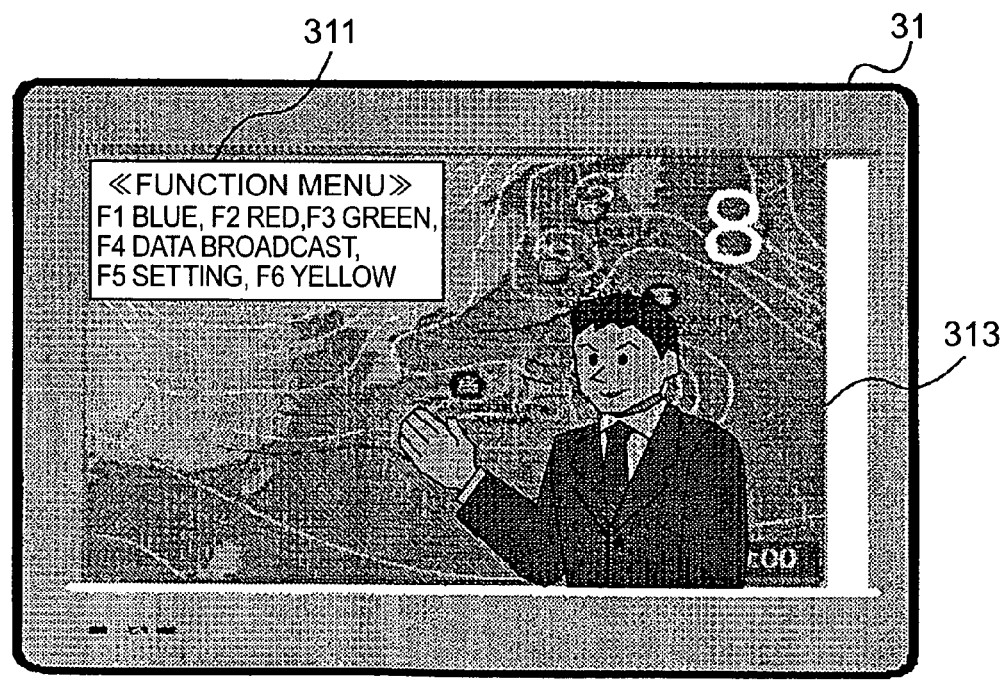
FIG. 18 is a diagram showing an example of the display menu of the function key assignment display in the case of a mode "TV mode"

FIG. 18 is a diagram showing an example of the display menu of the function key assignment display in the case of the mode "TV mode." As shown in FIG. 18, TV screen data (a TV screen layer) 313 is displayed on the display 31, and the display menu 311 of the function key assignment display in which the character string data of the function keys corresponding to the "TV mode" is described is displayed thereon.

Figure 19:
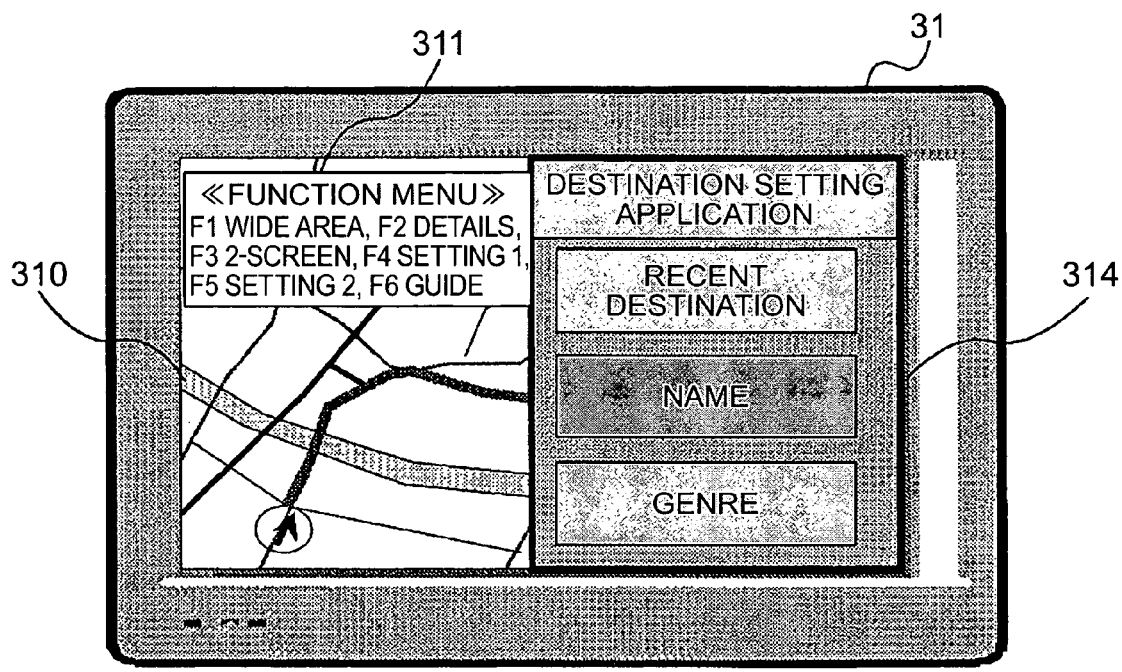
FIG. 19 is a diagram showing an example of the display menu of the function key assignment display in the case of a mode "navigation collaborative Java mode"

FIG. 19 is a diagram showing an example of the display menu of the function key assignment display in the case of the mode "navigation collaborative Java mode." As shown in FIG. 19, the map data (map display layer) 310 is displayed on the display 31, and a menu screen (Java screen layer) 314 of the navigation collaborative Java AP (point registration application) and the display menu 311 of the function key assignment display in which the character string data of the function keys corresponding to the "navigation collaborative Java mode" is described are displayed thereon.

Figure 20:
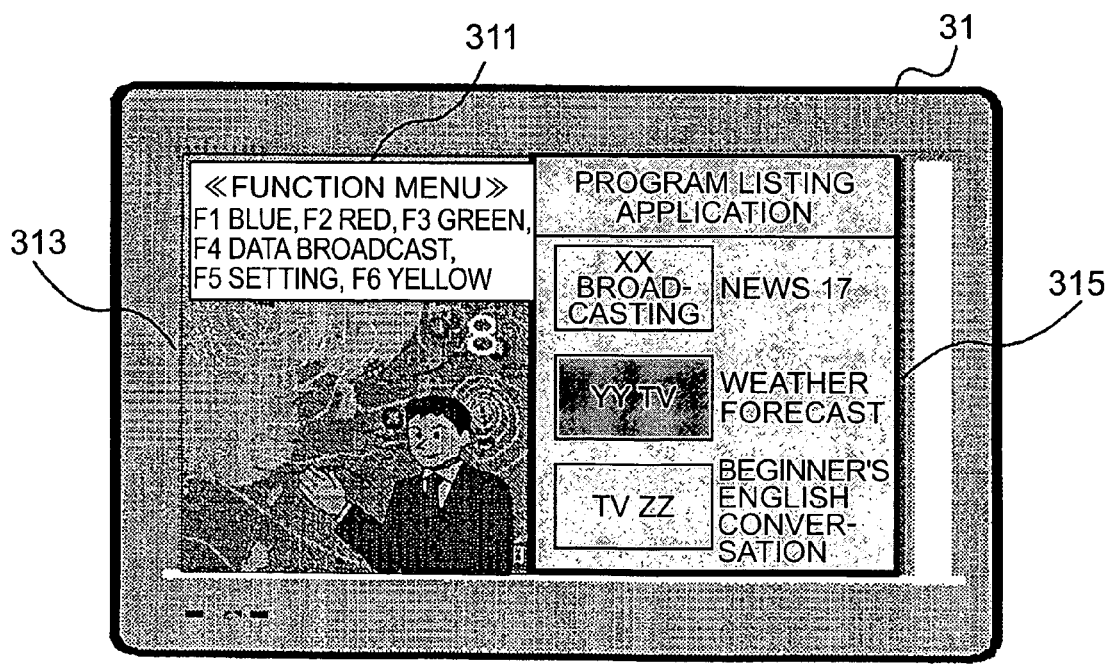
FIG. 20 is a diagram showing an example of the display menu of the function key assignment display in the case of a mode "TV collaborative Java mode"

FIG. 20 is a diagram showing an example of the display menu of the function key assignment display in the case of the mode "TV collaborative Java mode." As shown in FIG. 20, the TV screen data (TV screen layer) 313 is displayed on the display 31, and a menu screen (Java screen layer) 315 of the TV collaborative Java AP (program listing application) and the display menu 311 of the function key assignment display in which the character string data of the function keys corresponding to the "TV collaborative Java mode" is described are displayed thereon.

The description will be continued by returning to FIG. 15. If a display time registered with the field 11252 of the record 11250 searched in S10081 elapses after connecting the buffer for a function key display layer 10235 to the layer synthesis processing unit 10237, the function key assignment display processing unit 1130 controls the layer switch 10236 of the graphics driver 1023 and disconnects the buffer for a function key display layer 10235 from the layer synthesis processing unit 10237 (S10084). Thus, the layer synthesis processing unit 10237 stops superimposing and displaying the function key assignment display menu stored in the buffer for a function key display layer 10235 on the display 31.

Figure 21:
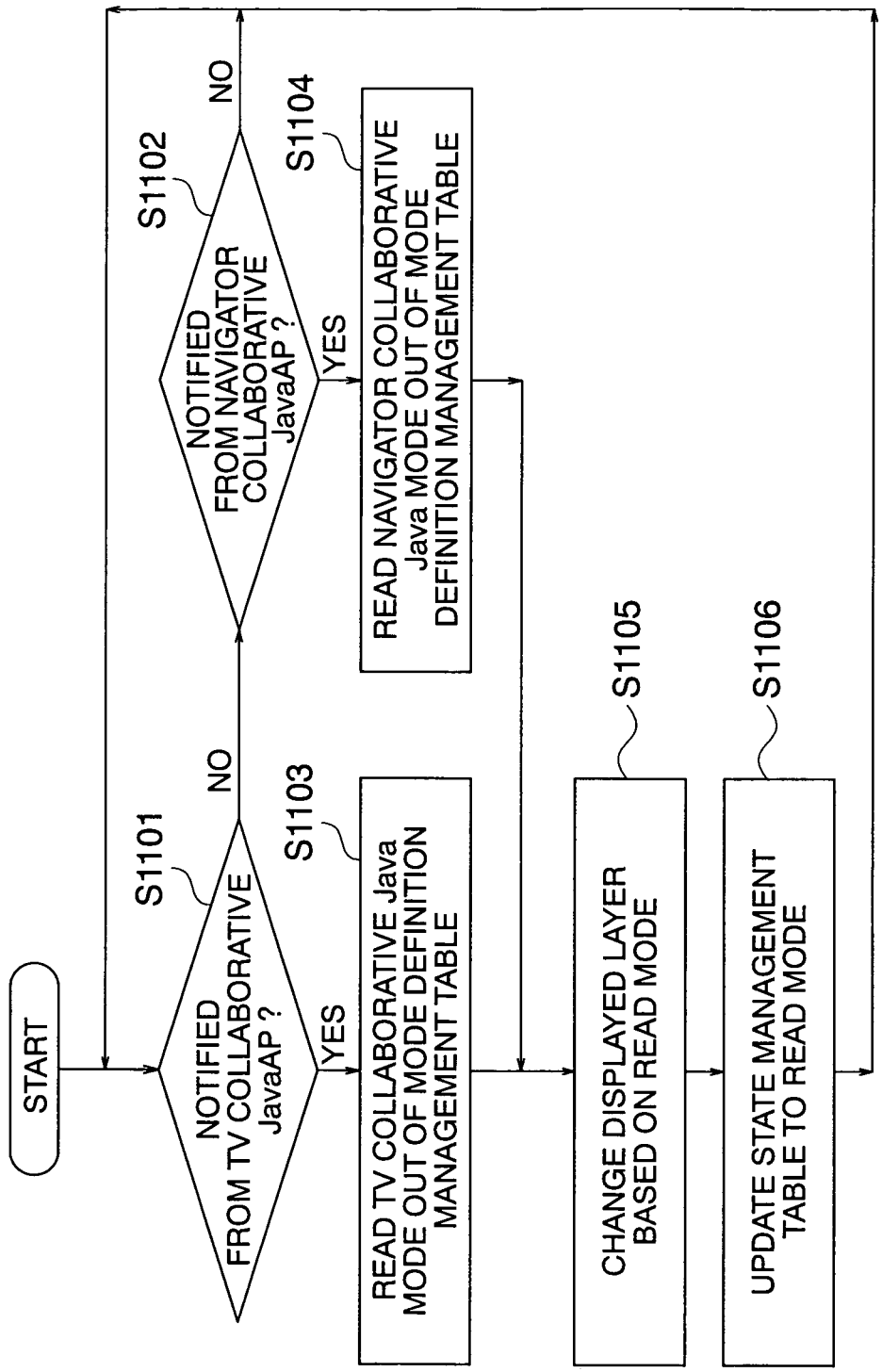
FIG. 21 is a diagram for describing the operation flow of a table setting unit 1126 of the key event processing unit 112.

FIG. 21 is a diagram for describing the operation flow of the table setting unit 1126 of the key event processing unit 112. According to this embodiment, the TV collaborative Java AP 109 and navigation collaborative Java AP 110 notify the key event processing unit 112 when they become active (in operation).

If notified from the TV collaborative Java AP 109 that the TV collaborative Java AP 109 became active (YES in S1101), the table setting unit 1126 accesses the mode definition management table 1123 and reads out the record 11230 in which the "TV collaborative Java mode" is registered with the field 11231 (S1103). Thereafter, it moves on to S1105.

If notified from the navigation collaborative Java AP 110 that the navigation collaborative Java AP 110 became active (YES in S1102), the table setting unit 1126 accesses the mode definition management table 1123 and reads out the record 11230 in which the "navigation collaborative Java mode" is registered with the field 11231 (S1104). Thereafter, it moves on to S1105.

In S1105, the table setting unit 1126 notifies the graphics driver 1023 of the layers to be displayed according to the fields 11234 to 11238 of the record 11230 read out in S1103 to S1104. To be more precise, it notifies the graphics driver 1023 of the layers corresponding to the fields in which "display" is stored out of the fields 11234 to 11238. Consequently, the layer switch 10236 of the graphics driver 1023 connects the buffers 10231 to 10235 corresponding to the layers of which "display" is notified to the layer synthesis processing unit 10237.

Lastly, the table setting unit 1126 changes the registered contents of the state management table 1121 to the registered contents of the record 11230 read in S1103 to S1104 (S1106).

Figure 22:
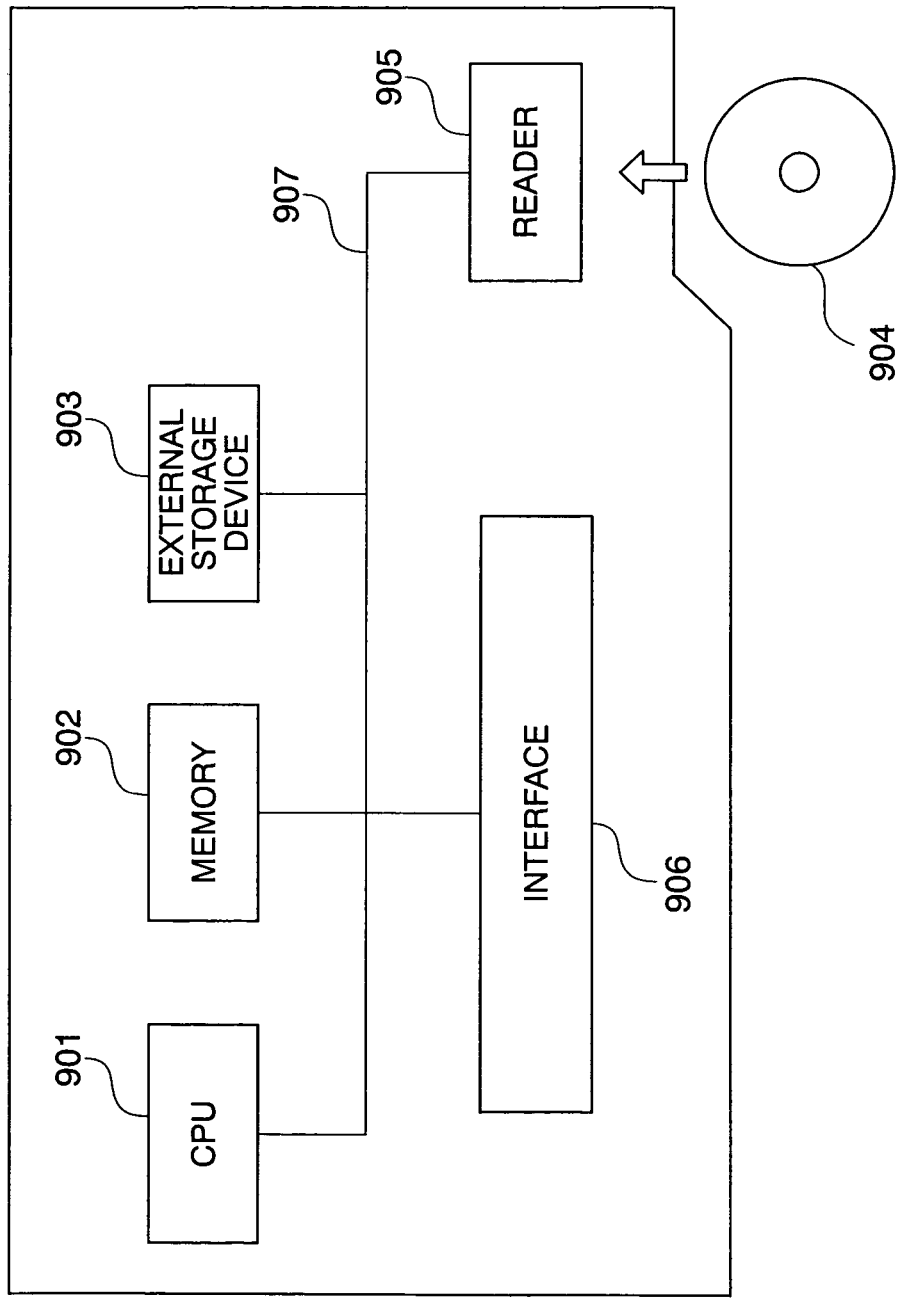
FIG. 22 is a diagram showing a hardware configuration example of the car navigation device 10.

The car navigation device 10 of the configuration can be realized by having a CPU 901 execute the program loaded on a memory 902 in a general computer system comprising the CPU 901, memory 902, an external storage device 903 such as an HDD, a reader 905 for reading data from a storage medium 904 such as a CD-ROM, a DVD-ROM or an IC card, an interface 906 for connecting to the operation panel 20, display 31, speaker 36, GPS receiver 33, in-vehicle sensor 34, tuner 35 and wireless terminal 32, and a bus 907 for connecting these devices as shown in FIG. 22 for instance. The program may be downloaded to the external storage device 903 from the storage medium 904 via the reader 905 or from a network 41 via the interface 906 and then loaded on the memory 902 to be executed by the CPU 901. The program may also be directly loaded on the memory 902 without going through the external storage device 903 so as to be executed by the CPU 901.

The above described one embodiment of the present invention.

According to this embodiment, the key event processing unit 112 manages the mode of the car navigation device 10, and decides a combination of the layers to be displayed on the display 31 according to the current mode (refer to FIG. 9). Here, transition of the mode is performed according to an occurrence of a predetermined key event (key type: a navigation key, a TV key or a Java key) or a notice from a predetermined AP (the TV collaborative Java AP 109 or navigation collaborative Java AP 110) which is started. Therefore, it is possible, according to this embodiment, to change the setting of the mode automatically according to a key operation of the user so as to improve operability in screen switching among a navigation screen, a TV screen and a Java screen.

The present invention is not limited to the embodiment, but various deformations are possible without departing from the scope of the invention. For instance, the embodiment described the case of using the Java technology as the technology for constructing the VM. However, the present invention is not limited thereto but may also be a combination of an application executed on another VM and a native application. It described the case of using the RTOS for built-in devices as an OS. However, it may also be a so-called off-the-shelf OS.

The embodiment described an example of the navigation system. However, the present invention is broadly applicable to information processing devices in which the VM operates on the OS.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A program readable by a computer, wherein:
the computer can execute native application programs which are application programs described in a native code and virtual machine application programs which are application programs described in a virtual machine code;
the program causes the computer to function as:
state management means for managing a plurality of modes of the computer to select one of the plurality of modes;
change processing means for deciding display or non-display of each of images generated by the native application programs and images generated by the virtual machine application programs according to one of the modes managed and to be selected by the state management means; and
output means for superimposing and outputting the images decided to be displayed by the change processing means in a predetermined order on a display, wherein:
the change processing means is configured to:
receive event data from an input device and transmit the event data to an event destination determined according to the mode at the time,
determine the necessity of changing the mode based on the received event data, and
change the mode managed by the state management means according to a type of a key event generated by a key operation of the input device connected to the computer so as to display only a layer determined according to the changed mode on the display, and
the plurality of modes comprises a navigation mode, a virtual machine application mode, a TV mode, a navigation collaborative virtual machine application mode, and a TV collaborative virtual machine application mode, the images having been decided to be displayed being controlled to be superimposed on the display at each of the navigation collaborative virtual machine application mode and the TV collaborative virtual machine application mode.

2. A display control method by which an information processing device capable of executing native application programs that are application programs described in a native code and virtual machine application programs that are application programs described in a virtual machine code controls display of images generated by the native application programs and images generated by the virtual machine application programs, the method comprising the steps of:
managing, by the information processing device, a plurality of modes of the information processing device;
deciding display or non-display of each of the images generated by the native application programs and the images generated by the virtual machine application programs according to one of the modes;
superimposing and outputting the images decided to be displayed in a predetermined order on a display;
receiving event data from an input device and transmitting the event data to an event destination determined according to the mode at the time,
determining the necessity of changing the mode based on the received event data, and
changing the one of the modes according to a type of a key event generated by a key operation of the input device connected to the information processing device so as to display only the layer determined according to the changed mode on the display,
wherein the plurality of modes comprises a navigation mode, a virtual machine application mode, a TV mode, a navigation collaborative virtual machine application mode, and a TV collaborative virtual machine application mode, the images having been decided to be displayed being controlled to be superimposed on the display at each of the navigation collaborative virtual machine application mode and the TV collaborative virtual machine application mode.

3. An information processing device comprising:
a processor capable of executing native application programs which are application programs described in a native code and virtual machine application programs which are application programs described in a virtual machine code, the processor being configured to comprise:
state management means for managing a plurality of modes of the information processing device to select one of the plurality of modes;
change processing means for deciding display or non-display of each of images generated by the native application programs and images generated by the virtual machine application programs according to one of the modes managed and to be selected by the state management means; and
output means for superimposing and outputting the images decided to be displayed by the change processing means in a predetermined order on a display, wherein:
the change processing means is configured to:
receive event data from an input device and transmit the event data to an event destination determined according to the mode at the time,
determine the necessity of changing the mode based on the received event data, and
change the mode managed by the state management means according to a type of a key event generated by a key operation of the input device connected to the information processing device so as to display only a layer determined according to the changed mode on the display, and
the plurality of modes comprises a navigation mode, a virtual machine application mode, a TV mode, a navigation collaborative virtual machine application mode, and a TV collaborative virtual machine application mode, the images having been decided to be displayed being controlled to be superimposed on the display at each of the navigation collaborative virtual machine application mode and the TV collaborative virtual machine application mode.

4. The information processing device according to claim 3, wherein the processor is configured to further comprise:
setting means for changing the mode managed by the state management means according to a notice from the virtual machine application program.

5. The information processing device according to claim 4, wherein:
the change processing means decides a key focus indicating a destination task of the key event generated by the key operation of the input device connected to the information processing device according to the mode managed by the state management means; and
the processor is configured to further comprise transmission means for transmitting the key event generated by the key operation of the input device connected to the information processing device to the destination task identified by the key focus decided by the change processing means.

6. The information processing device according to claim 4, wherein the processor is configured to further comprise:
priority control means for, according to a type of the key event generated by the key operation of the input device connected to the information processing device, heightening a task priority of a task for processing the type of event.

7. The information processing device according to claim 4, wherein the processor is configured to further comprise:
generation means for generating a key assignment display menu including character string data indicating functions of keys of the input device connected to the information processing device according to the mode managed by the state management means, and wherein:
the output means superimposes and outputs the images of the key assignment display menu generated by the generation means and the images decided to be displayed by the change processing means in predetermined order.

8. The information processing device according to claim 3, wherein:
the change processing means decides a key focus indicating a destination task of a key event generated by a key operation of an input device connected to the information processing device according to the mode managed by the state management means; and
the processor is configured to further comprise transmission means for transmitting the key event generated by the key operation of the input device connected to the information processing device to the destination task identified by the key focus decided by the change processing means.

9. The information processing device according to claim 8, wherein the processor is configured to further comprise:
priority control means for, according to a type of the key event generated by the key operation of the input device connected to the information processing device, heightening a task priority of a task for processing the type of event.

10. The information processing device according to claim 8, wherein the processor is configured to further comprise:
generation means for generating a key assignment display menu including character string data indicating functions of keys of the input device connected to the information processing device according to the mode managed by the state management means, and wherein:
the output means superimposes and outputs the images of the key assignment display menu generated by the generation means and the images decided to be displayed by the change processing means in predetermined order.

11. The information processing device according to claim 3, wherein the processor is configured to further comprise:
priority control means for, according to a type of the key event generated by the key operation of the input device connected to the information processing device, heightening a task priority of a task for processing the type of event.

12. The information processing device according to claim 11, wherein the processor is configured to further comprise:
generation means for generating a key assignment display menu including character string data indicating functions of keys of the input device connected to the information processing device according to the mode managed by the state management means, and wherein:
the output means superimposes and outputs the images of the key assignment display menu generated by the generation means and the images decided to be displayed by the change processing means in predetermined order.

13. The information processing device according to claim 3, wherein the processor is configured to further comprise:
generation means for generating a key assignment display menu including character string data indicating functions of keys of the input device connected to the information processing device according to the mode managed by the state management means, and wherein:

the output means superimposes and outputs the images of the key assignment display menu generated by the generation means and the images decided to be displayed by the change processing means in predetermined order.

14. The information processing device according to claim 3, wherein the images for the navigation mode and the virtual machine application mode are superimposed at the navigation collaborative virtual machine application mode, and wherein the images for the TV mode and the virtual machine application mode are superimposed at the TV collaborative virtual machine application mode.

15. The information processing device according to claim 3, wherein one of the plurality of modes is selected by the key operation, and the images to be displayed are displayed in accordance with the mode having been selected.

* * * * *